US012302475B2

(12) United States Patent
Skarda et al.

(10) Patent No.: US 12,302,475 B2
(45) Date of Patent: May 13, 2025

(54) APPARATUS FOR LIGHTING CONTROL

(71) Applicant: VIVINT, INC., Provo, UT (US)

(72) Inventors: Brian Skarda, South Jordan, UT (US); Chris Harris, Holladay, UT (US); Michael Papworth, Eagle Mountain, UT (US); Adam Richards, Murray, UT (US); Stephen Boynton, Pleasant Grove, UT (US); Brandon Layton, Farmington, UT (US)

(73) Assignee: Vivint LLC, Provo, UT (US)

( * ) Notice: Subject to any disclaimer, the term of this patent is extended or adjusted under 35 U.S.C. 154(b) by 174 days.

(21) Appl. No.: 17/860,881

(22) Filed: Jul. 8, 2022

(65) Prior Publication Data

US 2023/0111141 A1 Apr. 13, 2023

Related U.S. Application Data

(63) Continuation-in-part of application No. 17/497,645, filed on Oct. 8, 2021, now Pat. No. 11,849,521.

(51) Int. Cl.
*H05B 47/19* (2020.01)
*F21V 23/00* (2015.01)
(Continued)

(52) U.S. Cl.
CPC .......... *H05B 47/19* (2020.01); *F21V 23/009* (2013.01); *F21V 23/023* (2013.01); (Continued)

(58) Field of Classification Search
CPC .... H05B 47/19; H05B 47/115; H05B 47/165; H05B 47/11; H05B 47/00; H05B 47/105; H05B 47/12; H05B 45/10; H05B 45/18; H05B 45/20; H05B 45/22; H05B 45/24; H05B 45/325; H05B 45/37; H05B 47/16; F21V 23/009; F21V 19/006; F21V 23/003; F21V 23/06; F21V 29/77; F21V 3/00; F21V 31/00; F21V 7/00; G06F 3/02; G08B 25/001; G08B 25/10; F21W 2131/30
See application file for complete search history.

(56) References Cited

U.S. PATENT DOCUMENTS 6,654,732 B1 11/2003 Naito et al.
6,748,343 B2 6/2004 Alexander et al.
(Continued)

OTHER PUBLICATIONS

Hossain et al., "Adaptive Interaction Support in Ambient-Aware Environments Based on Quality of Context Information" in Multimed tools Appl (2013) 67: pp. 409-432 (Year: 2013).
(Continued)

*Primary Examiner* — Monica C King
(74) *Attorney, Agent, or Firm* — Nolte Lackenbach Siegel; N. Alexander Nolte

(57) ABSTRACT

Methods, systems, and devices for lighting control are described. An apparatus may include a processor, memory, a power component, a set of control buttons, and one or more radio components for lighting control. The apparatus may be a light control device associated with a home or automation system. The light control device may be a light switch cover with a cover plate that encapsulate a light switch. The light switch cover may have a radio, a battery, and control circuitry for lighting control.

20 Claims, 5 Drawing Sheets

(51) Int. Cl.

| | |
|---|---|
| ***F21V 23/02*** | (2006.01) |
| ***F21V 23/04*** | (2006.01) |
| ***F21W 131/30*** | (2006.01) |
| ***H05B 47/165*** | (2020.01) |

(52) U.S. Cl.

CPC ....... *F21V 23/0435* (2013.01); *H05B 47/165* (2020.01); *F21W 2131/30* (2013.01)

(56) References Cited

U.S. PATENT DOCUMENTS

| | | | | |
|---|---|---|---|---|
| 7,193,644 | B2 | 3/2007 | Carter | |
| 7,956,739 | B2 | 6/2011 | Hong et al. | |
| 8,139,095 | B2 | 3/2012 | Carter | |
| 8,144,183 | B2 | 3/2012 | Carter | |
| 8,144,184 | B2 | 3/2012 | Carter | |
| 8,154,581 | B2 | 4/2012 | Carter | |
| 8,164,614 | B2 | 4/2012 | Carter | |
| 9,414,030 | B2 | 8/2016 | Carter | |
| 9,432,638 | B2 | 8/2016 | Carter | |
| 9,485,478 | B2 | 11/2016 | Carter | |
| 9,516,284 | B2 | 12/2016 | Carter | |
| 9,648,290 | B2 | 5/2017 | Carter | |
| 9,653,323 | B2 | 5/2017 | Chew | |
| 10,674,120 | B2 | 6/2020 | Carter | |
| 10,986,717 | B1 | 4/2021 | Fu et al. | |
| 11,195,398 | B1 | 12/2021 | Fu et al. | |
| 11,581,099 | B1 | 2/2023 | Rufo et al. | |
| 2002/0070859 | A1 | 6/2002 | Gutta et al. | |
| 2002/0086660 | A1 | 7/2002 | Sullivan et al. | |
| 2003/0117280 | A1 | 6/2003 | Prehn | |
| 2003/0118216 | A1 | 6/2003 | Goldberg | |
| 2005/0176400 | A1 | 8/2005 | Mullet et al. | |
| 2005/0281435 | A1 | 12/2005 | Aggarwal | |
| 2006/0041500 | A1 | 2/2006 | Diana et al. | |
| 2009/0048859 | A1 | 2/2009 | McCarthy et al. | |
| 2009/0299825 | A1 | 12/2009 | Olawski et al. | |
| 2009/0299854 | A1 | 12/2009 | Olawski et al. | |
| 2010/0082174 | A1 | 4/2010 | Weaver et al. | |
| 2010/0289643 | A1 | 11/2010 | Trundle et al. | |
| 2011/0054973 | A1 | 3/2011 | Deich et al. | |
| 2012/0023145 | A1 | 1/2012 | Brannon et al. | |
| 2012/0284777 | A1 | 11/2012 | Eugenio et al. | |
| 2012/0316690 | A1 | 12/2012 | Li et al. | |
| 2014/0015981 | A1 | 1/2014 | Dietl | |
| 2014/0266681 | A1 | 9/2014 | Small | |
| 2014/0278028 | A1 | 9/2014 | Nye et al. | |
| 2014/0282048 | A1 | 9/2014 | Shapiro et al. | |
| 2014/0324192 | A1 | 10/2014 | Baskaran et al. | |
| 2015/0039105 | A1 | 2/2015 | Lee et al. | |
| 2015/0088329 | A1 | 3/2015 | Thiruvengada et al. | |
| 2015/0108901 | A1* | 4/2015 | Greene | H05B 47/19 315/149 |
| 2015/0228419 | A1 | 8/2015 | Fadell et al. | |
| 2015/0382436 | A1* | 12/2015 | Kelly | H05B 47/19 315/131 |
| 2016/0142407 | A1 | 5/2016 | Chun et al. | |
| 2016/0261425 | A1 | 9/2016 | Horton et al. | |
| 2016/0323972 | A1* | 11/2016 | Bora | H05B 47/11 |
| 2017/0234562 | A1 | 8/2017 | Ribbich et al. | |
| 2018/0114420 | A1 | 4/2018 | Siminoff et al. | |
| 2018/0165933 | A1 | 6/2018 | Siminoff | |
| 2018/0341835 | A1 | 11/2018 | Siminoff | |
| 2019/0327448 | A1 | 10/2019 | Fu et al. | |
| 2019/0357339 | A1 | 11/2019 | Kim et al. | |
| 2020/0180506 | A1 | 6/2020 | Nakayama et al. | |
| 2021/0051592 | A1 | 2/2021 | Wang et al. | |
| 2021/0056184 | A1 | 2/2021 | Modani et al. | |
| 2021/0296066 | A1 | 9/2021 | Zuniga | |
| 2022/0165036 | A1 | 5/2022 | Daley et al. | |

OTHER PUBLICATIONS

Unboxing The Ring Video Dorrbell is it Worth it video.

* cited by examiner

400

APPARATUS FOR LIGHTING CONTROL

CROSS-REFERENCES TO RELATED APPLICATIONS

This is a continuation-in-part of and claims priority to U.S. patent application Ser. No. 17/497,645 entitled "APPARATUS FOR LIGHTING CONTROL" and filed on Oct. 8, 2021, for Brian Vencil Skarda, et al., which is incorporated herein by reference in its entirety for all purposes.

BACKGROUND

The present disclosure, for example, relates to security and automation systems, and more particularly to lighting control in security and automation systems. Security and automation systems are widely deployed in a smart environment (e.g., a residential, a commercial, or an industrial setting) to provide various types of communication and functional features such as monitoring, communication, notification, and/or others. As demand for security and automation systems increases, some security and automation systems may fail to provide convenient or reliable techniques for controlling (e.g., activating and deactivating) various devices of the home automation system.

SUMMARY

The described techniques relate to improved techniques for security and automations systems, which may support a lighting control system. Generally, the described techniques provide for a panel for controlling one or more devices of the security and automation system as described herein. The panel may be in communication with a number of devices such as lighting devices (e.g., smart bulbs) and may provide a centralized method of controlling the lighting devices. In some examples, the panel may be an example of a smart light switch cover with a cover plate that encapsulates one or more light switches. The described techniques may relate to configuring the panel to control a number of light emitting sources via a number of programmable buttons of the panel to support enhanced visibility in a physical environment, improved control of lighting and other devices, among other benefits.

An apparatus of a home automation system is described. The apparatus may include a panel for controlling a set of devices associated with a home, wherein the panel is configured to communicate with a home automation hub associated with the home automation system, the panel including: a processor; memory in electronic communication with the processor; a power component; a set of control buttons comprising at least one control button configured to perform a first home automation system action based at least in part on a first activation duration and a second home automation system action based at least in part on a second activation duration; a first radio component configured to communicate with the set of devices using a first frequency band; and a second radio component configured to communicate with the home automation hub using a second frequency band.

In some examples of the apparatus, the power component includes a wireless power source.

In some examples of the apparatus, the panel is configured to be installed over a switch plate cover.

In some examples of the apparatus, the panel replaces the switch plate cover.

In some examples of the apparatus, the panel includes at least two screw holes for installing the panel over the switch plate cover.

In some examples of the apparatus, the set of devices includes one or more light sources associated with the home.

In some examples of the apparatus, one or more of the first home automation system action or the second home automation system action comprises activating a light source, deactivating the light source, dimming the light source, activating the set of devices associated with the home, deactivating the set of devices associated with the home, activating a setting of the panel, deactivating the setting of the panel, or any combination thereof.

Some examples of the apparatus herein may further include instructions stored in the memory and executable by the processor to cause the apparatus to activate the at least one control button based at least in part on receiving an input from a user associated with the home automation system, the input comprising the user associated with the home automation system pressing the at least one control button for one or more of the first activation duration or the second activation duration.

In some examples of the apparatus, the instructions are further executable by the processor to cause the apparatus to activate the at least one control button based at least in part on receiving the input from the user associated with the home automation system a number of times within a threshold period.

In some examples of the apparatus, the first activation duration is shorter than the second activation duration.

In some examples of the apparatus, the first frequency band is a 908.42 megahertz frequency band and the second frequency band is a 2.4 gigahertz frequency or a 915 megahertz frequency band.

In some examples of the apparatus, each control button of the set of control buttons is located on a perimeter of an anterior surface of the panel.

A home automation system is described. The home automation system including a lighting control panel; a set of home automation devices, wherein at least a subset of the set of home automation devices are controlled by the lighting control panel; and a home automation hub in wireless communications with the lighting control panel.

In some examples of the home automation system, the lighting control panel comprises a first radio device in wireless communications with the subset of the set of home automation devices.

In some examples of the home automation system, the lighting control panel further comprises a second radio device in wireless communications with the home automation hub.

In some examples of the home automation system, the home automation hub controls a set of lighting control panels distributed within a building associated with the home automation system.

In some examples of the home automation system, the lighting control panel is associated with a region associated with the building.

Another apparatus is described. The apparatus may include a front panel comprising a number of screw holes that align with a number of screw holes of a light switch panel, wherein the apparatus is configured to be installed over the light switch panel using the number of screw holes; a number of control buttons on the front panel, wherein the number of control buttons are flush with the front panel; and a back panel that encloses a number of radio components and a battery between the front panel and the back panel.

In some examples of the apparatus, the number of control buttons are distributed along a perimeter of an anterior surface of the front panel such that each control button comprises a portion of the perimeter of the anterior surface of the front panel and the number of control buttons form a contiguous perimeter of the anterior surface of the front panel.

DETAILED DESCRIPTION

Figure 1:
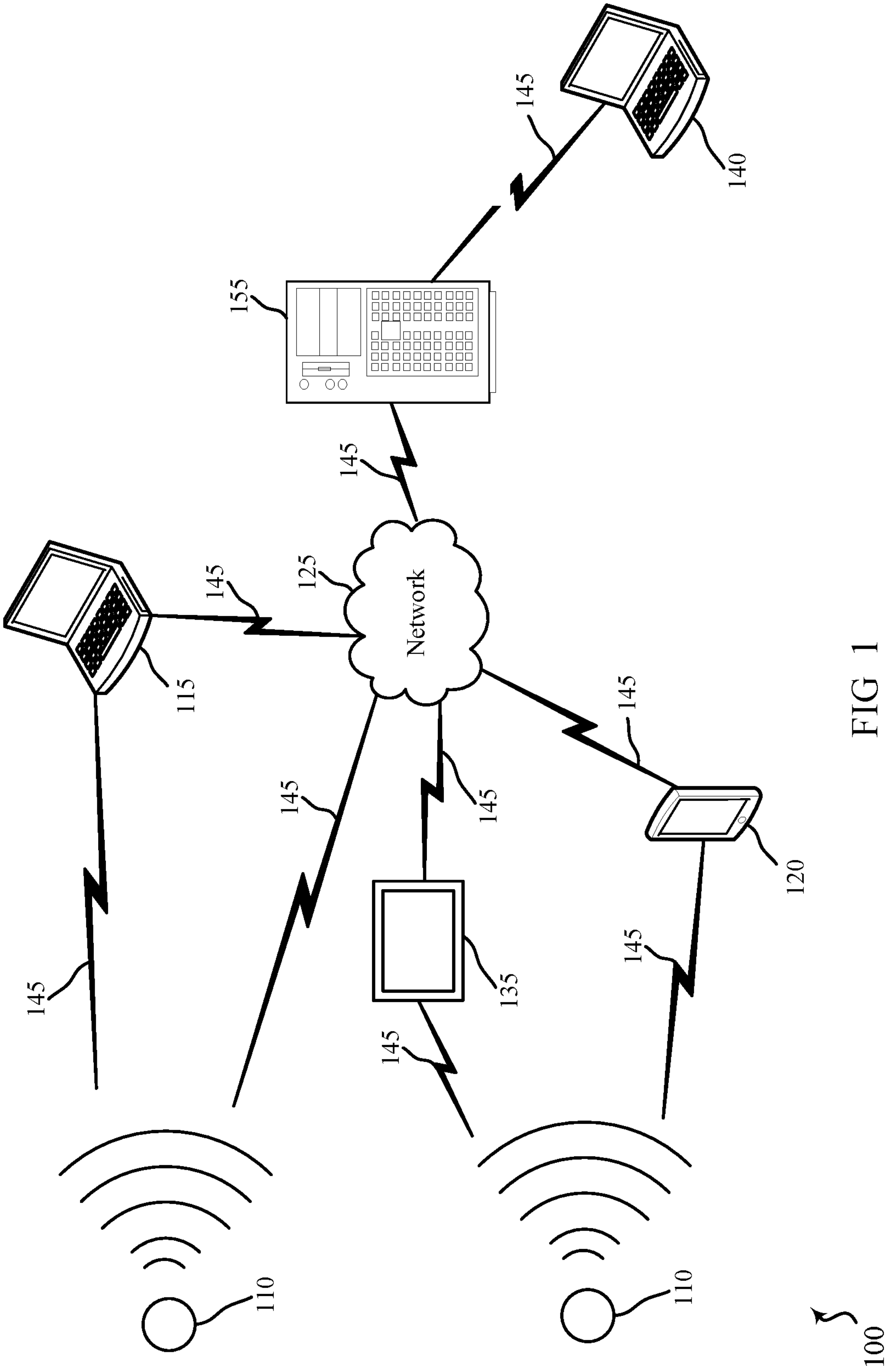
FIG. 1 illustrates an example of a system that supports techniques for lighting control in accordance with aspects of the present disclosure.

Some techniques for lighting in a physical environment may be limited or may require extensive power wiring or electrical skill for installation with a security and automation system. Various aspects of the present disclosure support techniques for lighting control that enables a user to control various devices in a security and automation system (e.g., the user may control or otherwise perform home automation system actions through a panel, for example, remotely or through various functionalities of the panel). These techniques may provide enhanced control and convenience for lighting and other systems of a home, for example, without requiring extensive or invasive installment, among other benefits. The term "security and automation system" may be used herein to describe a security system, an automation system, a smart home security and/or automation system, a smart lighting system, or any combination thereof, which may provide automation and/or security functionality. The term "home" used throughout this document generically refers to any dwelling, property, or structure that includes examples or aspects of an automation system and/or a security system. The term "panel" may be used herein to describe a light switch cover having a cover plate that completely encapsulates a light switch.

The panel may be in communication with the security and automation system. For example, the panel may be in communication with a number of devices such as lighting devices (e.g., smart bulbs) and may provide a centralized method of controlling the lighting devices. The panel may be configured to control a number of light emitting sources via a number of programmable controls (e.g., buttons, interfaces, etc.) of the panel to support enhanced visibility at a physical environment. For example, the panel may include a number of radio components (e.g., radio devices) such as a first radio component associated with communications in a first frequency range (e.g., such as a Z-Wave radio) and a second radio component operating in a second frequency range (e.g., Zigbee radio), where the frequency ranges may be different or offset from one another by a frequency value, or both. The panel may use the first radio component to communicate with a first device (e.g., a Wi-Fi hub) and the second radio component to communicate with one or more second devices (e.g., smart bulbs). Additionally, the panel may use the radio components to communicate with devices such as, but not limited to, a Wi-Fi hub, a cloud platform, an application of a user device, other control panels, or a combination thereof.

The panel may include a quantity of mechanical components, such as mechanical buttons, switches, and the like (e.g., the panel may include a number of mechanical buttons on a perimeter of the panel or otherwise located on the panel). The mechanical components may be configured to control one or more lighting devices which may, for example, constitute a subset of a total number of lighting devices of the security and automation system. The mechanical components may be programed to control functions (e.g., home automation actions) such as activating or deactivating one or more lighting devices, dimming one or more lighting devices, activating a timer associated with one or more lighting devices, and activating a motion enabled mode of the lighting devices, among other examples of functions or actions. Each mechanical component may be configured to control multiple functions. For example, a mechanical component may perform an action or function based on the length of the button pressure duration implemented by the user (e.g., a first button be configured with two functions where a first press duration activates the first function and a second press duration activates the second function).

In some cases, the panel may replace a traditional light switch. For example, a user may install the panel over an existing light switch cover and the panel may include a recess or other opening that encapsulate or otherwise receives the traditional light switch (e.g., the panel may include a cover plate placed and installed over the existing light switch, over the plate of the existing light switch, or the like, thereby covering the existing switch rendering it inaccessible to users, restraining or otherwise defining a state of the existing switch, or the like). Such an example may allow the user to install the panel in place of the existing light switch cover to utilize the traditional lights in addition or alternative to controlling either the same set of lighting devices or a different set of lighting devices via other functions or features of the panel.

In other embodiments and/or modes, a panel may be coupled and/or mounted directly to a wall, separately and/or independently from an existing switch. For example, a panel may have at least one first fastener aligned with an existing fastener for a switch (e.g., a screw, a screw hole, a bolt, a clip, a slot, or the like) for removably coupling the panel to the existing switch in a first mode, and may also have at least one second fastener (e.g., an adhesive, an adhesive strip, a surface shaped to receive an adhesive and/or adhesive strip, hook and loop fasteners, a screw or nail and a slot for hanging the panel on the screw or nail, or the like) for removably coupling the panel directly to the wall in a second mode.

In some examples, the panel may be powered by a portable power source such as a battery, thereby allowing the user to avoid hardwiring and other extensive installation measures. The panel may be implemented as part of a number of similar panels in an automation system and may be specified to control a set of devices geographically associated with the panel. For example, the panel may control a variety of smart devices such as, but not limited to, smart bulbs or other lighting devices, smart blinds, smart fans, or smart outlets in the area covered by the panel (e.g., a room in which the panel is installed).

Aspects of the disclosure are initially described in the context of security and automation systems. Aspects of the disclosure are further illustrated by and described with reference to apparatus diagrams, system diagrams, and flowcharts that relate to a smart automation system.

FIG. 1 illustrates an example of a system 100 that supports techniques for lighting control in accordance with aspects of the present disclosure. The system 100 may be referred to as a home automation system, a monitoring system, a security and automation system, a home security system, an automation system, or any combination thereof. The system 100 may include one or more sensor units 110, one or more local computing devices 120, control panel 135, remote computing device 140, and server 155. The network 125 may provide personal authentication credentials, encryption, access authorization, tracking, Internet Protocol (IP) connectivity, and other access, computation, modification, and/or functions. The control panel 135 may interface with the network 125 through a first set of wired and/or wireless communication links 145 to communicate with the server 155. The control panel 135 may perform communication configuration, adjustment, and/or scheduling for communication with the local computing device 120 and remote computing device 140, or may operate under the control of a controller. The control panel 135 may communicate with a back-end server (such as the server 155)—directly and/or indirectly—using the first set of one or more wireless communication links 145. In some examples, the server 155 may be a remote server located at a location different or same from the control panel 135, the local computing device 120, and/or the remote computing device 140.

The control panel 135 may wirelessly communicate with the remote computing device 140 and the local computing device 120 by way of one or more antennas. The control panel 135 may provide communication coverage for a respective coverage area (e.g., residential, commercial). In some examples, the control panel 135 may be referred to as a control device, a controller, a base transceiver station, a radio base station, an access point, a radio transceiver, or some other suitable terminology. The coverage area for a control panel 135 may be divided into sectors making up only a portion of the coverage area. The system 100 may include control panels of different types. In some examples, the system 100 may include overlapping coverage areas for one or more different parameters, including different technologies, features, subscriber preferences, hardware, software, technology, and/or methods.

For example, one or more control panels 135 may be related to one or more discrete structures (e.g., a house, a business) and each of the one more discrete structures may be related to one or more discrete areas (e.g., multiple houses in a neighborhood). In other examples, multiple control panels 135 may be related to the same one or more discrete structures (e.g., multiple control panels relating to a house and/or a business complex). For example, one or more control panels 135 may be located within a house. Additionally or alternatively, each room within the house may have a designated control panel 135 located within each room. In some cases, the one or more control panels 135 may communicate with one another via one or more communication protocols. In some examples, the one or more control panels 135 may form a mesh network within the house and communicate with one another via the mesh network. In some examples, a control panel 135 may modify or update a security parameter based on information received from one or more other control panels 135 in the mesh network.

The local computing device 120 or the remote computing device 140 may be dispersed throughout the system 100. In some examples, the local computing device 120 and/or the remote computing device 140 may be stationary and/or mobile. In some examples, the local computing device 120 and/or the remote computing device 140 may include a cellular phone, a personal digital assistant (PDA), a wireless modem, a wireless communication device, a handheld device, a tablet computer, a laptop computer, a cordless phone, a wireless local loop (WLL) station, a display device (e.g., TVs, computer monitors), a printer, a camera, and/or the like. The local computing device 120 and/or the remote computing device 140 may, additionally or alternatively, include or be referred to by those skilled in the art as a user device, a smartphone, a BLUETOOTH® device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology.

In some examples, the control panel 135 may be a smart home system panel, for example, an interactive panel mounted on a wall or other surface in a person's home. Additionally or alternatively, the control panel 135 may be an example of a lighting control panel as described herein (e.g., the control panel 135 may control various devices in the system and may include a panel installed over a traditional light switch as described with reference to FIGS. 2 and 3). The control panel 135 may be in direct communication via wired or wireless communication links 145 with the one or more sensor units 110, or may receive sensor data from the one or more sensor units 110 via the local computing device 120 and the network 125, or may receive data via the remote computing device 140, the server 155, and the network 125.

Additionally or alternatively, the control panel 135 may wirelessly communicate with the sensor units 110 via one or more antennas. The sensor units 110 may be dispersed throughout the system 100 and each sensor unit 110 may be stationary and/or mobile. The sensor units 110 may include and/or be one or more sensors that sense: proximity, motion, temperatures, humidity, sound level, smoke, structural features (e.g., glass breaking, window position, door position), time, light, geo-location data of a person and/or a device, distance, biometrics, weight, speed, height, size, preferences, light, darkness, weather, time, system performance, and/or other inputs that relate to a security and/or an automation system.

The local computing device 120, the remote computing device 140, and/or a the sensor units 110 may be able to communicate through one or more wired and/or wireless connections with various components such as a control panel, base stations, and/or network equipment (e.g., servers, wireless communication points) and/or the like. In some examples, the one or more sensor units 110 may be located within a structure (e.g., house). Additionally or alternatively, in some examples, the structure may have a designated sensor unit located within one or more predetermined areas (e.g., rooms). In some cases, the one or more sensor units 110 may communicate with one another via one or more communication protocols. In some examples, the one or more sensor units 110 may form a mesh network within the structure and communicate with one another via the mesh network. In some examples, the mesh network associated with the sensor units 110 may be different or be a part of a mesh network associated with one or more control panels.

The wireless communication links 145 shown in the system 100 may include uplink (UL) transmissions from a local computing device 120 to a control panel 135, and/or downlink (DL) transmissions, from a control panel 135 to the local computing device 120. The downlink transmissions may also be called forward link transmissions while the uplink transmissions may also be called reverse link transmissions. The wireless communication links 145 may include one or more carriers, where each carrier may be a signal made up of multiple sub-carriers (e.g., waveform signals of different frequencies) modulated according to the various radio technologies. Each modulated signal may be sent on a different sub-carrier and may carry control information (e.g., reference signals, control channels), overhead information, user data, etc. The wireless communication links 145 may transmit bidirectional communications and/or unidirectional communications. The wireless communication links 145 may include one or more connections, including but not limited to, 345 MHz, Wi-Fi, BLUETOOTH®, BLUETOOTH® Low Energy, cellular, Z-WAVE®, 802.11, peer-to-peer, LAN, wireless local area network (WLAN), Ethernet, FireWire®, fiber optic, and/or other connection types related to security and/or automation systems.

In some examples, the control panel 135, the local computing device 120, and/or the remote computing device 140 may include one or more antennas for employing antenna diversity schemes to improve communication quality and reliability between the control panel 135, the local computing device 120, and the remote computing device 140. Additionally or alternatively, the control panel 135, the local computing device 120, and/or the remote computing device 140 may employ multiple-input, multiple-output (MIMO) techniques that may take advantage of multi-path, mesh-type environments to transmit multiple spatial layers carrying the same or different coded data.

While the local computing device 120 and/or the remote computing device 140 may communicate with each other through the control panel 135 using wireless communication links 145, the local computing device 120 and/or remote computing device 140 may also communicate directly with one or more other devices via one or more direct communication links (not shown). Examples of direct communication links may include Wi-Fi Direct, BLUETOOTH®, wired, and/or, and other P2P group connections. The control panel 135, the local computing device 120, and/or the remote computing device 140 in these examples may communicate according to the WLAN radio and baseband protocol including physical and medium access control (MAC) layers from Institute of Electrical and Electronics Engineers (IEEE) 802.11, and its various versions including, but not limited to, 802.11b, 802.11 g, 802.11a, 802.11n, 802.11ac, 802.11ad, 802.11ah, etc. In other implementations, other peer-to-peer connections and/or ad hoc networks may be implemented within system 100.

The local computing device 120 and the remote computing device 140 may be custom computing entities configured to interact with the sensor units 110 via the network 125, and in some examples, via the server 155. In other examples, the local computing device 120 and the remote computing device 140 may be general purpose computing entities such as a personal computing device, for example, a desktop computer, a laptop computer, a netbook, a tablet personal computer (PC), a control panel, an indicator panel, a multi-site dashboard, an iPod®, an iPad®, a smart phone, a mobile phone, a personal digital assistant (PDA), and/or any other suitable device operable to send and receive signals, store and retrieve data, and/or execute modules. The local computing device 120 may include memory, a processor, an output, a data input and a communication module.

The processor may be a general purpose processor, a field-programmable gate array (FPGA), an application-specific integrated circuit (ASIC), a digital signal processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some examples, the local computing device 120 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, receiving and displaying data from the sensor units 110.

The processor of the local computing device 120 may be operable to control operation of the output of the local computing device 120. The output may be a television, a liquid crystal display (LCD) monitor, a cathode ray tube (CRT) monitor, speaker, tactile output device, and/or the like. In some examples, the output may be an integral component of the local computing device 120. Similarly, the output may be directly coupled with the processor. For example, the output may be the integral display of a tablet and/or smart phone. In some examples, an output module may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing device 120 to the output.

The remote computing device 140 may be a computing entity operable to enable a remote person to monitor the output of the sensor units 110. The remote computing device 140 may be functionally and/or structurally similar to the local computing device 120 and may be operable to receive data streams from and/or send signals to at least one of the sensor units 110 via the network 125. The network 125 may be the Internet, an intranet, a personal area network, a local area network (LAN), a wide area network (WAN), a virtual network, a telecommunications network implemented as a wired network and/or wireless network, etc. The remote computing device 140 may receive and/or send signals over the network 125 via the wireless communication links 145 and server 155.

In some examples, the sensor units 110 may be sensors configured to conduct periodic or ongoing automatic measurements related to detecting an occurrence of an event. In some examples, the sensor units 110 may be configured to determine presence, occupancy, identity, and location based on a received request. Each sensor unit 110 may be capable of sensing multiple identification and/or location determining parameters, or alternatively, separate sensor units 110 may monitor separate identification and/or location determining parameters. For example, one sensor unit 110 may determine an identity of a person, while another sensor unit 110 (or, in some examples, the same sensor unit 110) may detect an occupancy of and/or location of the person. The sensor units 110 may be separate from the control panel 135 and may be positioned at various locations throughout the house or the property. In other examples, the sensor units

110 may be integrated or collocated with other house and/or building automation system components, home appliances, and/or other building fixtures. For example, a sensor unit 110 may be integrated with a doorbell or door intercom system, or may be integrated with a front entrance light fixture. In other examples, a sensor unit 110 may be integrated with a wall outlet and/or switch. In other examples, the sensor units 110 may be integrated and/or collocated with the control panel 135 itself. In some examples, each of the sensor units 110, control panel 135, and/or local computing device 120 may include a speaker unit, a microphone unit, and/or a camera unit, among other things.

In some cases, a property may be monitored by the control panel 135 and/or sensor units 110. In some examples, the control panel 135 may include sensor units 110 such that the control panel 135 may directly receive signals (e.g., motion sensed, entry/exit detected) associated with the property. Each sensor unit 110 may be capable of sensing multiple occupancy parameters, or alternatively, separate sensor units may monitor separate occupancy parameters. For example, one sensor unit may be a motion sensor, while another sensor unit may detect security parameters by monitoring vibration or audio. In some cases, sensor units 110 may additionally monitor alternate security and occupancy parameters, for example by monitoring heartbeat or breathing.

In some examples, occupancy may be detected by any one of a motion sensor, audio sensor, radio frequency identification (RFID) sensor, video camera, light-break sensor, or a combination thereof. In some examples, the sensor units 110 may be separate from the control panel 135, and may be positioned at various locations, also referred to herein as zones, throughout a property. In other examples, the sensor units 110 may be integrated or collocated with other security and automation system components. For example, a sensor unit 110 may be integrated with a wall, door, window for detecting entry and/or exit of a person relative to the property. In other examples, the sensor units 110 may be integrated or collocated with the control panel 135 itself.

In the system 100, the control panel 135 may be an example of or include aspects of a lighting control panel as described herein. For example, the control panel 135 may control one or more devices of the security and automation system as described herein. The control panel 135 may be in communication with a number of devices such as lighting devices (e.g., smart bulbs) and may provide a centralized method of controlling the lighting devices. In some examples, the control panel 135 may be an example of a smart light switch. The described techniques may relate to configuring the control panel 135 to control a number of light emitting sources via a number of programmable buttons of the control panel to support enhanced visibility at the physical environment, improved control of lighting and other devices in the system, and the like, among other benefits.

Figure 2:
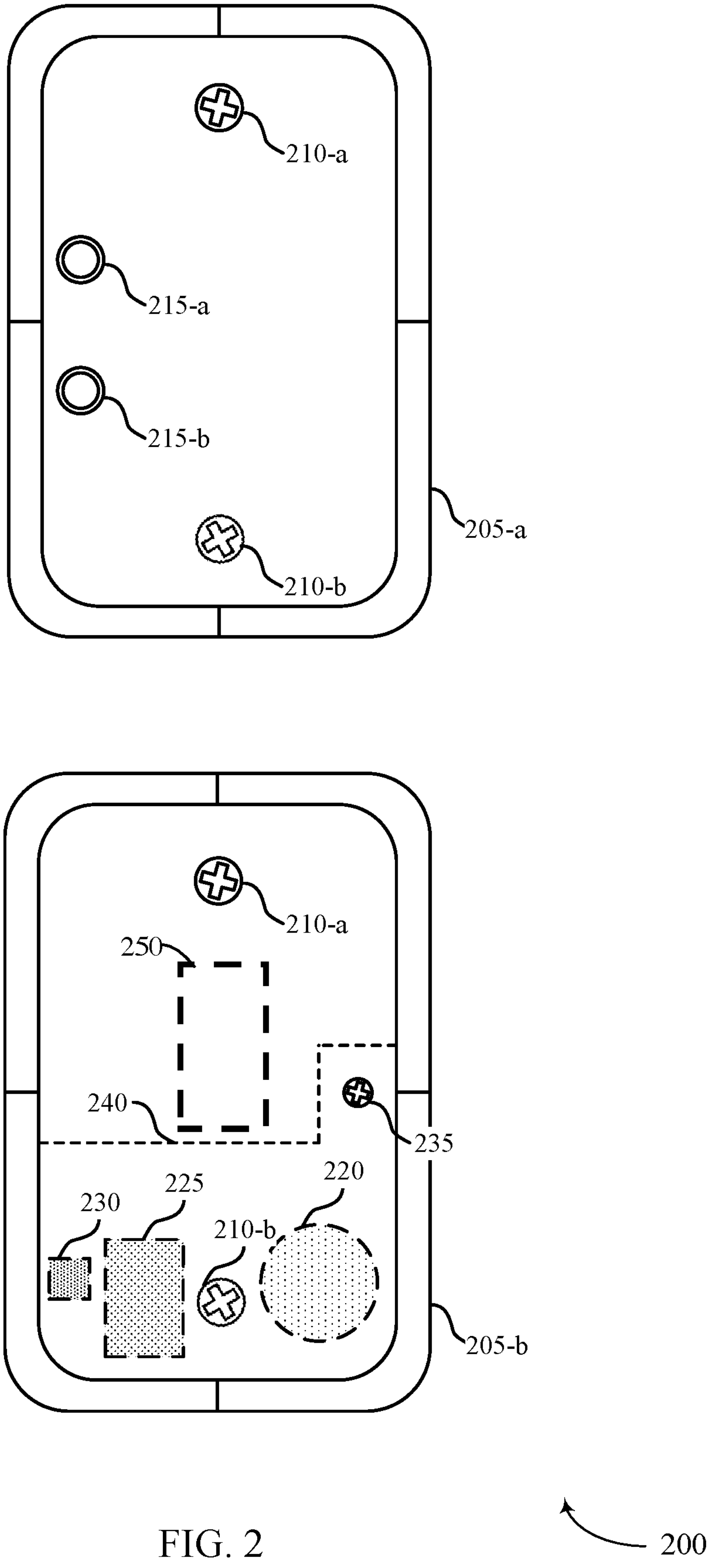
FIGS. 2 and 3 illustrate examples of panel diagrams that support techniques for lighting control in accordance with aspects of the present disclosure.

FIG. 2 illustrates an example of a panel diagram 200 that support techniques for lighting control in accordance with aspects of the present disclosure. The panel diagram 200 may illustrate various views of a panel 205. For example, a panel 205-*a* may be an example of an outer view of the panel 205 and the panel 205-*b* may be an example of a partially exposed inner view of the panel 205, the panel 205-*b* may be an example of a submount 205-*b* to which the panel 205-*a* may be removably coupled, or the like. In some embodiments, a submount 205-*b* may comprise at least one fastener 210-*a*, 210-*b* aligned with a fastener for an existing switch to removably couple the panel 205 to the switch in a first mode (e.g., a screw, a screw hole, a bolt, a clip, a slot, or the like), may comprise at least one second fastener to removably couple the panel 205 directly to the wall independent and/or separately from any existing switch in a second mode (e.g., an adhesive, an adhesive strip, a surface shaped to receive an adhesive and/or adhesive strip, hook and loop fasteners, a screw or nail and a slot for hanging the panel on the screw or nail, or the like), may comprise at least one third fastener to removably couple the panel 205-*a* to the submount 205-*b* (e.g., a clip, a hook, a slot, a friction fit, a lip, a rim, or the like), and/or another fastener. Components such as the power source 220, the first wireless component 225, and/or the second wireless component 230, in one embodiment, may be disposed and/or installed in a submount 205-*b*, or the like. In a further embodiment, components such as the power source 220, the first wireless component 225, and/or the second wireless component 230 may be disposed and/or installed in a panel 205-*a*, or the like.

The panel 205 may be considered a panel for controlling a set of devices within a smart home. The panel 205 may communicate with a home automation hub. The panel 205 may include a processor and a memory to facilitate various control functions. In some examples, the panel 205 may include attachment sites 210-*a* and 210-*b*. The attachment sites 210 may facilitate installment over an existing light switch plate cover and may allow the panel 205 to encapsulate or replace the traditional light switch plate cover.

The attachment sites 210 may include or be examples of screw holes. For example, the user may remove the traditional switch plate cover and use the same screws along with attachment sites 210 to install the panel 205. Additionally or alternatively, the user may remove the screws from the traditional plate cover, place the panel 205 over the traditional plate cover such that the traditional plate cover is encapsulated, and install the screws through the attachment sites 210 (e.g., the screw may attach both the panel 205 and the traditional plate cover to the wall). In some examples, the user may install the panel 205 without extensive power wiring or electrical skill, for example, due to attachment sites 210 being compatible with existing light switches.

The panel 205 may be associated with a region within the smart home, which may include a set of devices controlled by the control panel. For example, the panel 205 may be associated with a room of the home or structure (e.g., in communication with a home automation hub and/or other smart hub that is also in communication with other panels each associated with different regions of the home or structure). Additionally or alternatively, the panel 205 may be associated with the entire home or structure. In some cases, the set of devices may include one or more lighting devices which may, for example, constitute a subset of a total number of lighting devices of the smart home. The associated region may be the same as the region originally associated with the traditional light switch or may be a different region, and the panel 205 may control a same subset of lighting devices or may control a different subset of lighting devices as the traditional light switch.

The set of devices may be controlled through buttons 215-*a* and 215-*b* which may be examples of mechanical components, though the buttons 215 may be examples of other mechanical components (e.g., switches). In some examples, the buttons 215 may be programmable. As shown for illustrative clarity, the buttons 215-*a* and 215-*b* may be located on and/or distributed along a perimeter of an anterior surface of the panel 205-*a*, forming a contiguous perimeter of the surface, though the buttons 215 may be located or situated in any location of the panel 205-*a*, the buttons 215 may include any quantity or type of mechanical component, or any combination thereof. The buttons 215 may, in some cases, be flush with the surface. Each of the buttons 215 may be sensitive to different pressures and push durations and configured to control multiple functions. For example, the button 215-*a* may be configured with two functions where a first press duration activates the first function and a second press duration activates the second function, in some cases, the first duration may be shorter than the second duration.

As an illustrative example, the button 215-*a* may activate a first function (e.g., activating the set of devices, such as turning a set of lighting devices on) if a user applies pressure for the first duration, the button 215-*a* may activate a second function (e.g., deactivating the set of devices) if the user applies pressure for the second duration, and so on (e.g., a third function may correspond to a third duration, and any quantity of functions and durations may be used). In some examples, different patterns may activate the various functions. For example, a tap or single instance of pressure in a threshold period (e.g., threshold duration of time) may activate the first function, two taps or two instances of pressure within the threshold period may activate a second function, and so on. In some examples, a user may configure the various functions and methods at the control panel. For example, a user may configure which function scheme to use (e.g., tapping, pressure durations, etc.) as well as which functions correspond to a respective function scheme (e.g., the user may configure a first action for a first duration or quantity of taps, among other examples of function schemes). Additionally or alternatively, various aspects of such schemes or actions may be preconfigured at the panel 205-*a*.

As another illustrative example, the button 215-*b* may be configured with two functions, where a first press duration activates the third function and a second press duration activates the fourth function. Example functions as described herein may include but are not limited to activating one or more devices of a set of devices associated with the home, deactivating the one or more devices, activating a setting of the panel, deactivating a setting of the panel, or any combination of these functions, among other examples of functions. For example, the control panel may activate a light source, deactivate a light source, dim a light source, activate a timer associated with the activation of a light source, or activate a motion enabled mode of the light source. Such functions may additionally or alternatively be referred to as automation system actions.

The various functions and configurations described herein may additionally or alternatively be performed by other means. For example, the panel 205-*a* may be operable to receive instructions (e.g., from a user device, the home automation hub, or both) to perform one or more functions. In some examples, the panel 205-*a* may not include the same number of buttons 215 or may include no buttons 215 and may instead be operated remotely to perform the various functions or actions. The panel 205-*b* may illustrate an example of a partially exposed view of the panel 205-*a*. For example, the panel 205-*b* may show or include a power source 220, which may be an example of a wireless power source such as a battery. In some examples, the power source 220 may be within the panel 205-*b* (e.g., a surface of the panel 205-*a* may cover the power source 220). In some cases, the power source 220 may enable the panel 205 with power, for example, without hardwiring light switches or the panel 205-*b* into a power source of the home, though in other examples the panel 205-*b* may include such a connection to an electrical system or power source of the home. The power source 220 may support an extended battery life (e.g., about 10 years with an average of 100 button presses per day, though other operating conditions and battery lives may be used).

In some embodiments, a battery or other wireless power source 220 may be disposable and/or replaceable. In a further embodiment, a battery or other wireless power source 220 may be rechargeable. For example, a battery or other wireless power source 220 may inductively charge from an existing switch and/or associated wiring over which the panel 205-*b* is installed, the panel 205-*b* may periodically be plugged into a power source for charging (e.g., using a universal serial bus (USB) connection or other wired electrical connection), or the like. In one embodiment, an electrical contact of the panel 205-*b* and/or of the wireless power source 220 may be electrically coupled and/or installed in contact with an electrical contact, wire, and/or other conductor of an existing switch, to receive electric power from the existing switch to charge the wireless power source 220, to power the panel 205-*b*, or the like.

In certain embodiments, electric power may be available to the panel 205-*b* and/or to the power source 220 from an existing switch only when the existing switch is in a predefined state and/or position and not in another state and/or position. For example, the panel 205-*b* and/or the power source 220 may charge a battery 220 while the existing switch is in an off position and may use electric power from the battery 220 at least while the existing switch is in an on position (e.g., while power from the switch is not available, or the like).

Within a recess 250 or other opening 250 shaped to receive an existing switch, the panel 205-*b*, in one embodiment, may comprise a mechanical actuator configured to restrain a state of an existing switch by dynamically and/or selectively toggling the existing switch between an on position and an off position. For example, the panel 205-*b* may periodically turn the existing switch off in order to charge the battery 220 during times when the light or other device associated with the existing switch is off, may turn the existing switch on or off to control a state of a non-smart device such as an existing ceiling fan, fireplace, or the like that is not controllable wirelessly, and/or may otherwise control a state of the existing switch by mechanically restraining it in a certain state. In another embodiment, the panel 205-*b* may be configured to restrain a state of an existing switch within a recess 250 or other opening 250 in the panel 205-*b* by locking the switch in a single position, such as an on position (e.g., in order to provide a constant or substantially constant source of electric power to a smart light or other smart device associated with the existing switch, so the existing switch is not accidently or inadvertently turned off, or the like).

The panel 205-*b* may also include a number of radio components such as a first radio component 225 associated with communications in a first frequency band (e.g., such as a Zigbee radio component) and a second radio component 230 associated with communications in a second frequency band (e.g., such as a Z-Wave radio). In some examples, the first frequency band and the second frequency band may be different or may be offset by a frequency value, or both. For example, the first frequency band may be a 908.42 megahertz frequency band while the second frequency band may be a 2.4 gigahertz frequency band or a 915 gigahertz frequency band, though any frequency bands for various communications may be used. In some cases, the panel 205-*b* may communicate through radio component 225 with a first set of devices using the first frequency band and through radio component 230 with a second set of devices using the second frequency band. For example, the panel 205-*b* may communicate with a Wi-Fi hub via the first radio component 225 and may communicate with one or more lighting devices via the second radio component 230, or vice versa.

Thus, the panel 205-*b* may transmit instructions or other signals to the one or more lighting devices (or other devices in a system) activating one or more functions (e.g., instructing the devices to perform one or more home automation actions). Additionally or alternatively, the panel 205-*b* may receive or send communications (e.g., instructions, signals, etc.) to the home automation hub using the first radio component 225. Such techniques may enable a user to initiate actions via another device (e.g., the user may have a smart phone and an application that the user may select an action, the device may forward the action to the home automation hub, the home automation hub may forward the action to the first radio component 225, and the second radio component 225 or another aspect of the panel 205-*b* may perform the action, for example, by sending instructions to perform the action to a respective one or more devices). In some examples, the panel 205-*b* may include different quantities or types of radio components. For example, the panel 205-*b* may include a single radio component configured to perform various communications, or the panel 205-*b* may include additional radio components each associated with a respective subset of devices or functionalities.

The panel 205-*b* may include a back panel 240, which may enclose the power source 220 and the radio components 225 and 230 between the front panel and the back panel 240. The attachment site 235 may attach the back panel 240 to the rest of the panel 205-*b*. In some examples, the panel 205 may include a logic board operable to manage the functions and operations of the panel 205. Stated alternatively, the logic board may be an example of or include a processor and memory configured to perform the various actions/functions described herein.

Figure 3:
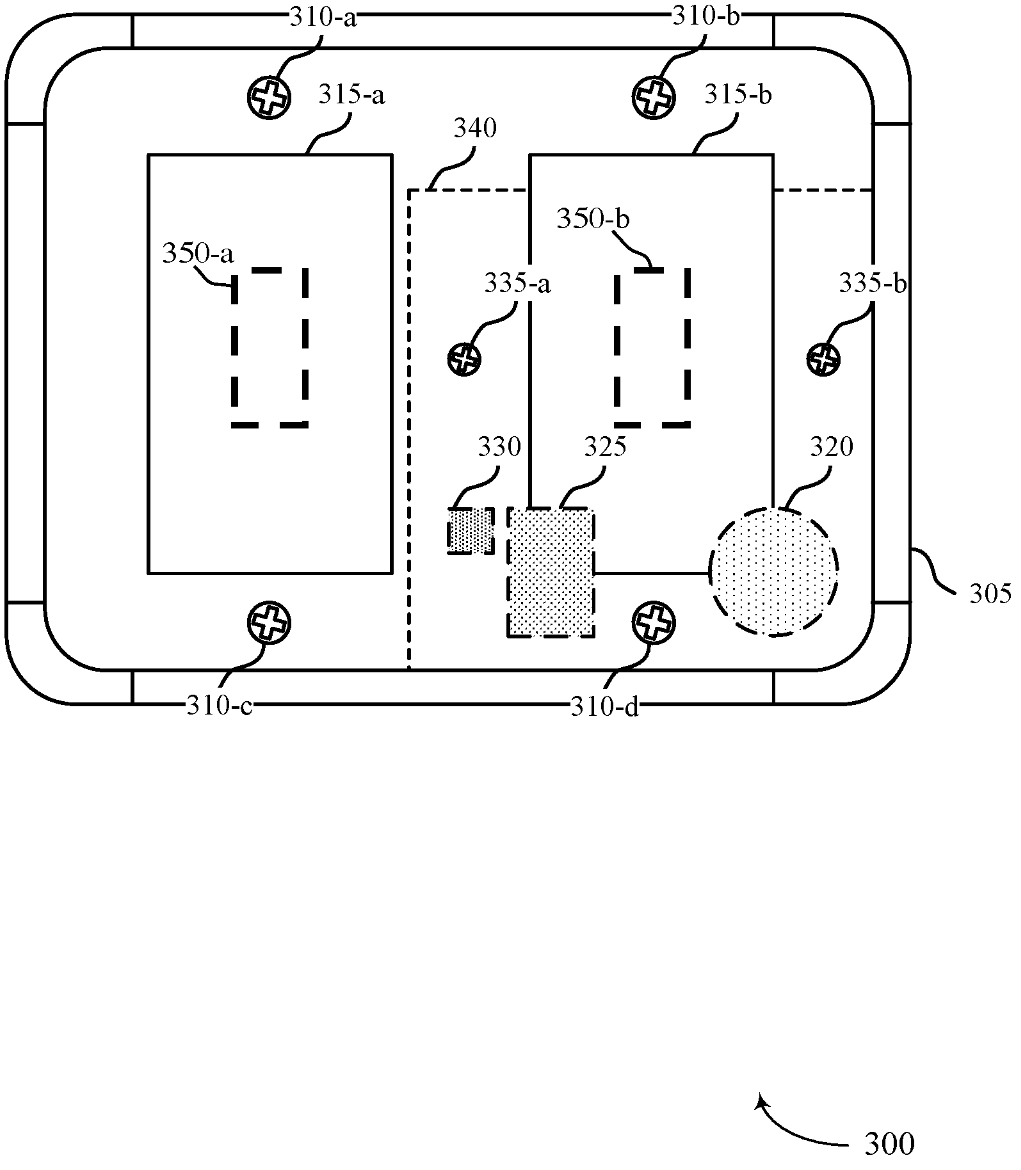

FIG. 3 illustrates an example of a panel diagram 300 that supports techniques for lighting control in accordance with aspects of the present disclosure. In some examples, the panel diagram 300 may illustrate an example of a panel 305, which may be an example of or include aspects of a panel 135 or a panel 205 as described herein. For example, the panel 305 may include attachments sites 310, buttons 315, a power source 320, radio components, or any combination thereof, which may be examples of the corresponding components as described with reference to FIG. 2. Generally, the schematic 300 may illustrate a panel 305 configured to fit over or replace a traditional light switch with multiple switches. For example, the panel 305 may be configured to fit over or replace a traditional switch with two switches, fit over or replace a traditional switch with three switches, fit over or replace a traditional switch with four switches, or the like. In other embodiments, the panel 305 may be configured to expand and/or extend a number of switches (e.g., fitting over or replacing a single traditional switch with two switches, three switches, four switches, or the like; fitting over or replacing two traditional switches with three switches, four switches, or the like; and/or otherwise increasing a number of switches).

For example, in some embodiments where the panel 305 is configured to fit over multiple existing switches, the panel 305 may comprise multiple recesses 350-*a*, 350-*b*, each recess 350-*a*, 350-*b* shaped to encapsulate and restrain a state of one of the existing switches (e.g., locking a switch in an on position, dynamically toggling a switch between an on and an off position using a mechanical actuator, or the like), such as a first recess 350-*a* shaped to encapsulate a first switch, a second recess 350-*b* shaped to encapsulate a second switch, a third recess 350 shaped to encapsulate a third switch, a fourth recess 350 shaped to encapsulate a fourth switch, or the like.

Similarly, in certain embodiments, a panel 305 may comprise a set of buttons 215, 315 corresponding to each switch encapsulated by recesses 250, 350 of the panel 305. For example, a panel 305 may comprise a first set of buttons 215-*a*, 215-*b* corresponding to a first switch, may comprise a first set of buttons 315-*a* corresponding to a first switch and a second set of buttons 315-*b* corresponding to a second switch, may comprise a third set of buttons 215, 315 corresponding to a third switch, may comprise a fourth set of buttons 215, 315 corresponding to a fourth switch, or the like. A button 215, 315 may comprise user interface hardware configured to receive input from a user, such as a mechanical button, a rocker button, a touch sensitive surface, a graphical user interface element displayed on a touchscreen of a panel 205, 305 or other electronic display screen, or the like. Each set of buttons 215, 315, in certain embodiments, may correspond to a device controlled by the panel 205, 305 and/or by a home automation hub in communication with the panel 205, 305.

The panel 305 may include one or more mechanical components configured to replace and/or expand the functionality of the traditional switches. For example, the panel 305 may include two buttons 315, which may be examples of buttons 215 as described with respect to FIG. 2, or the buttons 215 may be examples of other mechanical components (e.g., switches). The two buttons 315 may be operable to perform functions associated with activating or deactivating one or more lighting devices (e.g., the button 315-*a* may perform a first action based on applying pressure for a duration or pattern associated with the first action or the button 315-*a* may perform a second action based on applying the pressure for a second duration or a second pattern associated with the second action, though any function scheme or quantity of actions may be implemented). The buttons 315 may additionally or alternatively be configured to perform other actions or functions as described herein.

The panel 305 may include additional attachment sites 315 relative to the panel 205, for example, to mirror a quantity of attachment sites of a traditional light switch. The panel 305 may include a cover 340 that conceals or includes the various inner components of the panel 305, such as the power source 320, the radio components, the inner attachment sites 335, or any combination thereof, which may be examples of the respective components as described with reference to FIG. 2.

Figure 4:
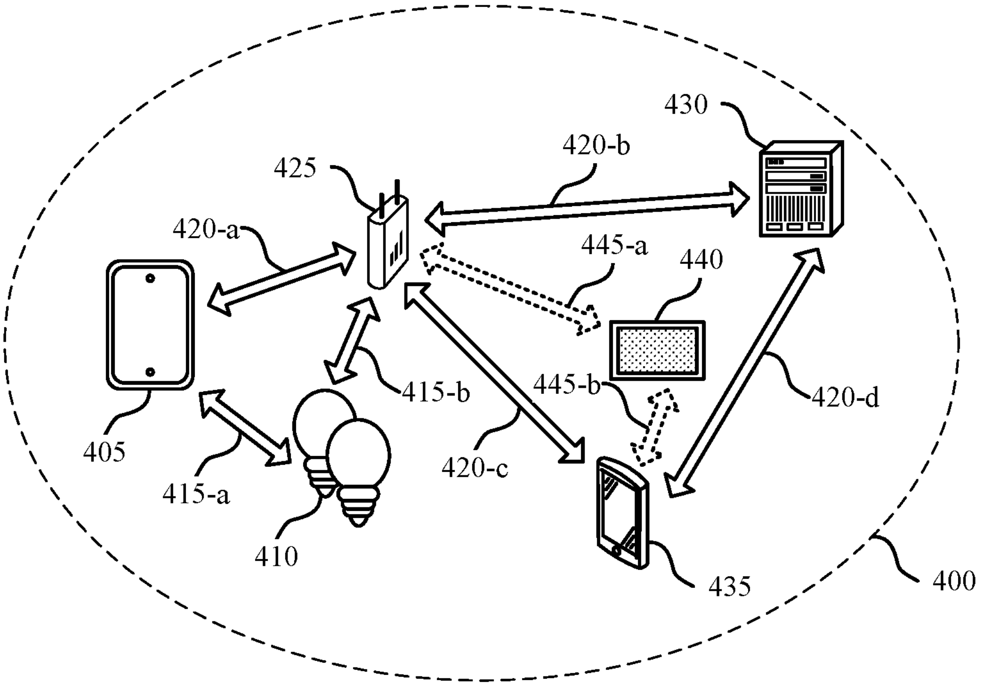
FIG. 4 illustrates an example of a system that supports techniques for lighting control in accordance with aspects of the present disclosure.

FIG. 4 illustrates an example of a system 400 that supports techniques for lighting control in accordance with aspects of the present disclosure. The system 400 may include one or more panels 405, which may be examples of panels 205 and 305 with reference to FIGS. 2 and 3. The system 400 may include a Wi-Fi device 425, one or more lighting devices 410, a user device 435, a home automation hub 440, a remote device 430, or any combination thereof, among other examples of devices (e.g., sensors and devices as described with reference to FIG. 1). A panel 405 may be electrically connected to the one or more lighting devices 410. For example, the panel 405 may activate or deactivate one or more functions (e.g., activate or deactivate a light, change a dim level of the lights, etc.) or modes (e.g., a motion sensing mode of the lighting devices) of the lighting devices 410 using a communication link 415-*a*.

The communication link 415-*a* is an example of wired or wireless electronic communication link. For example, the lighting devices 410 may be examples of smart devices including a radio component capable of communicating instructions, status information, and the like with the panel 405, the Wi-Fi device 425, or both, among other examples of devices in the system 400. In some examples, a first radio component of the panel 405 may be configured to communicate using the communication link 415-*a*, a second radio component may be configured to communicate with the Wi-Fi device 425, or a combination thereof. The panel 405 may communicate with the Wi-Fi device 425 via the communication link 420-*a*. In some examples, the panel 405 may receive communications from the Wi-Fi device 425.

For example, the user device 435 or the home automation hub 440 or both may receive input from a user indicating to activate one or more functions, actions, or modes associated with the panel 405. The user device 435 or the home automation hub 440 may instruct the panel 405 (e.g., remotely) to perform the indicated home automation action or function by transmitting the instructions to the Wi-Fi device 425 via a respective communication link to be forwarded to the panel 405 and/or the one or more lighting devices 410. Additionally or alternatively, a user may provide such input directly to the panel 405 as described herein (e.g., the user may operate one or more mechanical components as described with reference to FIGS. 2 and 3 to initiate an action of the lighting devices 410 or other devices or components of an automation system or any combination thereof).

The system 400 may be an example of a hubless configuration. For example, the system 400 may not include the home automation hub 440. In such examples, the components of the system 400 (e.g., the user device 435, the panel 405, the Wi-Fi device 425, etc.) may communicate directly with each other. In some other examples, the system 400 may support the home automation hub 440 and the home automation hub 440 may represent a centralized communication node capable of relaying, generating, or establishing communications, controlling one or more devices in conjunction or separate from the panel 405, and the like. Although depicted as having some connection links between devices for illustrative clarity, it is to be understood that any configuration is possible (e.g., any device may communicate or not communicate with any other device).

The Wi-Fi device 425 may be associated with communications in a first frequency range (e.g., Zigbee radio component) and may communicate with panel 405 using the first frequency band on communication link 420-*a*, while the panel may also communicate with the lighting devices through a second frequency range (e.g., Z-Wave radio), though other frequency ranges and communication schemes are possible. In some examples, the remote device 430 may be an example of a platform (e.g., a cloud or server 155 supporting the system 400).

The user may install the panel 405 as described herein. Thus, the user may realize improved control of various systems and actions of the system 400. For example, the user may perform any of the actions or functions described herein using the panel 405 or the user device 435 or both. The system 400 may perform some, none, or all of the actions without user input. For example, the system 400 may include various sensors configured to detect one or more parameters and initiate actions based on the one or more parameters. As an illustrative example, a user may configure a motion sensing mode (e.g., an occupancy mode) of the lighting devices 410 using the panel 405. In such an example, the lighting devices 410 may include or be coupled to a motion sensor, a light sensor, a sound sensor, or any other type of sensor. The sensors may report one or more parameters (e.g., parameters indicating an occupancy or presence of a person in a region associated with the panel 405). The lighting devices 410 may activate or deactivate a lighting function based on the one or more parameters. Thus, the lighting devices 410 may be configured to automatically activate or deactivate light in a region based on identifying an occupancy of the region.

The system 400 may include multiple panels 405. For example, a home may include several regions (e.g., rooms, areas) and each region or multiple regions may be associated with a respective panel 405. The panels 405 may be individually controllable or addressable (e.g., via an application on the user device 435). For example, a user may control a first set of devices paired or otherwise associated with a first panel 405, a second set of devices associated with a second panel 405, and so on (e.g., the devices in a region of the panel 405 may be controlled by that panel 405). In some examples, the panels 405 may communicate with each other. For example, a first panel 405 may detect an occupancy change or predict that an occupancy change in a different region associated with a second panel 405 is likely to occur. In such examples, the first panel 405 may indicate to the second panel 405 to perform one or more actions based on the detection (e.g., the second panel 405 may activate one or more lights if the first panel 405 detects, from one or more sensors, that a user is moving from a room with the first panel 405 to a room with the second panel 405, in which case the first panel 405 may or may not deactivate lights of the first region).

In some examples, a panel 405 may be configured with different subsets of devices. For example, the panel 405 may include a first mechanical component for controlling (e.g., initiating one or more home automation actions) a first subset of devices, a second mechanical component for controlling a second subset of devices, and so on, among other examples (e.g., the first mechanical component may control all the devices of a region and the second mechanical component may control a subset of the devices in the region). In some examples, a user may be able to define or configure what actions, settings, modes, and the like are mapped to each mechanical component, the user may configure which devices (e.g., which lighting devices 410) map to a mechanical component, or any combination thereof.

Figure 5:
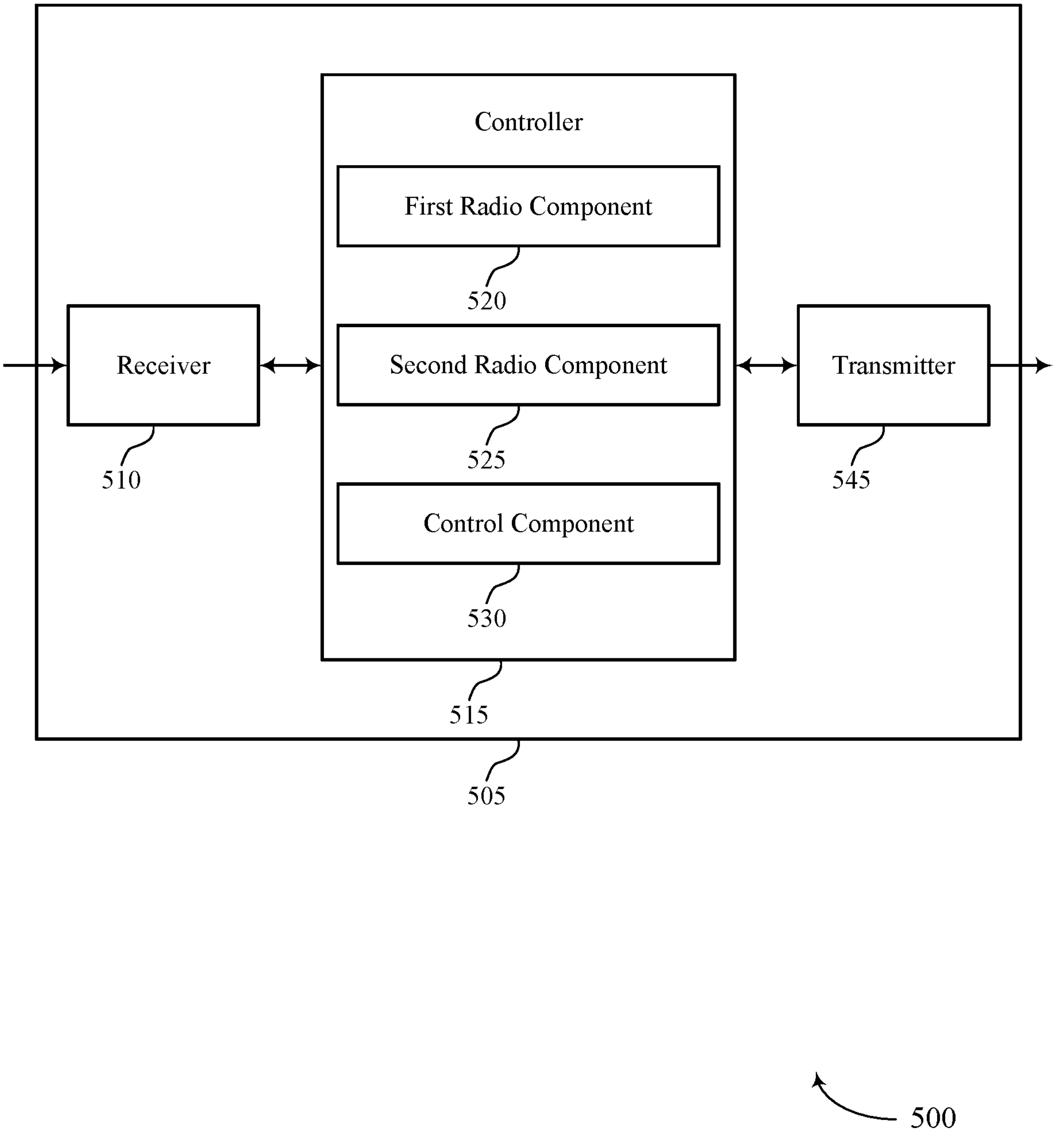
FIG. 5 illustrates an example of a block diagram of a device that supports techniques for lighting control in accordance with aspects of the present disclosure.

FIG. 5 shows a block diagram 500 of a device 505 that supports techniques for lighting control in accordance with aspects of the present disclosure. The device 505 may be an example of aspects of a panel as described herein with reference to FIGS. 1 through 4. The device 505 may include a receiver 510, a controller 515, and a transmitter 545. The device 505 may also include a processor. Each of these components may be in communication with one another (e.g., via one or more buses).

The receiver 510 may receive information such as packets, user data, or control information associated with various information channels (e.g., control channels, data channels, and information related to a smart monitoring system, etc.). Information may be passed on to other components of the device 505. The receiver 510 may utilize a single antenna or a set of antennas.

The controller 515 may include a first radio component 520, a second radio component 525, a control component 530, or any combination thereof. In some examples, the first radio component 520, the second radio component 525, or both may include or be examples of the receiver 510 and the transmitter 545, or may be distinct from the receiver 510 and the transmitter 545. The first radio component 520 and the second radio component 525 may be examples of radio components as described herein with reference to FIGS. 1 through 4. The control component 530 may be an example of mechanical components as described with reference to FIGS. 1 through 4.

The controller 515 may communicate with a home automation hub associated with a home automation system, for example, via the second radio component 525. The controller 515 may perform a first automation system action based on a first activation duration and a second home automation system action based at least in part on a second activation duration. For example, the control component 530 may be an example of a set of control buttons including at least one control button configured to perform a first home automation system action based on a first activation duration and a second home automation system action based on a second activation duration. That is, the control component 530 may perform a first home automation system action based on a first activation duration and a second home automation system action based on a second activation duration. The first radio component 520 may be configured to communicate with the set of devices using a first frequency band. The second radio component 525 may be configured to communicate with the home automation hub using a second frequency band.

The device 505 includes a panel for controlling a set of devices associated with a home, where the panel is configured to communicate with a home automation hub associated with the home automation system, and the panel includes a processor, memory in electronic communication with the processor, a power component, or any combination thereof, in addition or alternative to the components of the device 505 (e.g., the first radio component 520, the control component 530, the second radio component 525).

In some embodiments, the device 505 (e.g., a panel or the like) may selectively transmit communications (e.g., instructions, messages, commands, or the like) to either the set of one or more devices or the home automation hub (which may control and/or otherwise communicate with a second set of one or more devices) based on input from a user received by user interface hardware of the device 505 (e.g., a button, a sensor, a camera or other optical sensor, a microphone or other audio sensor, a fingerprint scanner, or the like). In this manner, in certain embodiments, user interface hardware of a single device 505 such as a panel or the like may control both one or more local devices directly in communication with the device 505, as well as one or more other devices not directly in communication with the device 505.

For example, a device 505 such as a panel may comprise different user interface hardware (e.g., different buttons or the like) associated with different devices, may associate different patterns and/or types of user input with different devices (e.g., based on a duration of presses or other interactions, a number or frequency of presses or other interactions, a location of an interaction, a direction of an interaction, a combination of buttons or other user interface hardware elements pressed or otherwise interacted with, a predefined voice command, identifying a certain user, or the like), and/or otherwise differentiate user inputs for different devices and/or for different home automation actions to be performed.

The device 505, such as a panel, in certain embodiments, may receive communications (e.g., instructions, messages, commands, or the like) from a home automation hub (e.g., using the receiver 510 or the like). For example, a home automation hub may receive user input (e.g., directly from a user at the home automation hub, over a data network from an application executing on a computing device of the user, from another panel or other device 505, or the like) intended to trigger a home automation action for one or more devices in communication with the device 505, may determine to trigger a home automation action for one or more devices based on data from a sensor (e.g., detecting presence of a user, detecting movement of a user, detecting an security condition or other alarm condition, or the like), or may otherwise determine to trigger a home automation action. The device 505, such as a panel, may transmit one or more additional communications (e.g., instructions, messages, commands, or the like) to one or more devices associated with the device 505 to perform one or more additional actions based on one or more communications received from the home automation hub.

For example, in response to sensor data indicating the presence of an intruder to a home automation hub, the home automation hub may transmit a communication (e.g., an instruction, a message, a command, or the like) to the device 505, such as a panel, and the device 505 may transmit one or more communications to devices associated with the home or other building, sounding an alarm, flashing or otherwise activating an exterior light (e.g., a red colored light indicating the alarm condition), or the like.

In another example, in response to a user, a user's phone or other computing device, a user's vehicle, or the like approaching and/or arriving at a home or other building associated with the home automation hub and/or the device 505 (e.g., crossing a geofence, opening a garage door, joining a wireless network, being identified by a camera or other sensor, entering a door code associated with the user, or the like), the home automation hub may transmit a communication to the device 505 and the device 505 may transmit one or more communications to one or more devices associated with the home or other building to perform one or more actions (e.g., execute a configurable scene for the user, activate lighting, play music, open or close a window covering, turn a fan on or off, lock or unlock a door, light a fireplace, power an electrical outlet, turn on or play a predefined channel or video or music on a television or other device, start or stop a kitchen appliance, start or stop a sprinkler system, open or close a garage door, adjust a temperature or other function of a thermostat or furnace or air conditioning unit, or the like). In a further example, the device 505, such as a panel, in response to receiving input from a user to user interface hardware or another sensor, may transmit one or more communications to the home automation hub to cause one or more other devices associated with the home or other building to perform one or more actions (e.g., execute a configurable scene for the user, activate lighting, play music, open or close a window covering, turn a fan on or off, lock or unlock a door, light a fireplace, power an electrical outlet, turn on or play a predefined channel or video or music on a television or other device, start or stop a kitchen appliance, start or stop a sprinkler system, open or close a garage door, adjust a temperature or other function of a thermostat or furnace or air conditioning unit, or the like).

In these examples, in various embodiments, a device 505 such as a panel and a home automation hub, each in communication with different sets of devices associated with a home or other building, cooperate to control the different sets of devices based on user input and/or other sensor data from either the device 505, the home automation hub, or both. In this manner, the device 505 such as a panel encapsulating a traditional light switch, in some embodiments, may enable a user to control lighting, an electrically actuated window covering, a fan, a lock, a fireplace, an electrical outlet, a television, a speaker, a kitchen appliance, a sprinkler system, a garage door, a thermostat, a furnace, an air conditioning unit, and/or one or more other devices associated with a home or other building, using buttons or other user interface hardware of the device 505, using an interface of the home automation hub, using an application executing on a mobile device or other hardware computing device in communication with the home automation hub, or the like.

In certain embodiments, the device 505, such as a panel, and/or a home automation hub, may transmit communications to one or more devices in communication with the device 505 and/or one or more devices in communication with the home automation hub to perform actions associated with a scene. A scene may be configurable and/or preselected by a user, and associated with input received by user interface hardware, by another sensor, and/or triggered by another event. For example, a scene may comprise one or more settings for a lighting device (e.g., on, off, a brightness or dimming level, a color or tone, or the like), an electrically actuated window covering, a fan, a lock, a fireplace, an electrical outlet, a television, a speaker, a kitchen appliance, a sprinkler system, a garage door, a thermostat, a furnace, an air conditioning unit, and/or one or more settings for another device associated with a home or other building, coordinated as part of the same scene.

In some embodiments, a device 505 such as a panel and/or a home automation hub may enable or disable a scene based on an intentional, predefined, action taken by a user (e.g., a predefined pattern and/or type of user input such as an activation duration of presses or other interactions, a number or frequency of presses or other interactions, a location of an interaction, a direction of an interaction, a combination of buttons or other user interface hardware elements pressed or otherwise interacted with, a predefined voice command, a user selecting an away mode, a user selecting a home mode, a user selecting a vacation mode, or the like). In a further embodiment, a device 505 such as a panel and/or a home automation hub may enable or disable a scene based on a sensed event or occurrence (e.g., identifying presence of and/or an identify of a user based on data from user interface hardware or another sensor, determining that no occupants are present, determining that at least a threshold number of occupants are present, a tracked location of a user, an intruder and/or another alarm condition, a timer, sunset, sunrise, a garage door opening, a front door opening, a holiday or other calendar event, or the like).

In one embodiment, a device 505 such as a panel and/or a home automation hub may cooperate with each other and/or with one or more additional devices 505 such as additional panels to extend a scene or other device control to multiple rooms or other locations. For example, panels or other devices 505 may cooperate to track locations of a user, of multiple users, or the like (e.g., based on data from user interface hardware or other sensors) as they move between rooms and/or other locations within the home or other building, and may transmit communications to associated devices to change to different scenes in different rooms and/or other locations based on the tracked locations. In this manner, in certain embodiments, one or more devices 505 such as panels and/or a home automation hub may enable scenes to follow a user room to room, may wayfind or otherwise light a path of a user as the user moves, may select customized scenes for different users as the different users are identified, or the like.

In some examples, the power component includes a wireless power source. In some examples, the panel is configured to be installed over a switch plate cover. In some examples, the panel replaces the switch plate cover. In some examples, the panel includes at least two screw holes for installing the panel over the switch plate cover. In some examples, the set of devices includes one or more light sources associated with the home.

In some examples, one or more of the first home automation system action or the second home automation system action includes activating a light source, deactivating the light source, dimming the light source, activating the set of devices associated with the home, deactivating the set of devices associated with the home, activating a setting of the panel, deactivating the setting of the panel, or any combination thereof. In some examples, the control component 530 includes at least one additional control button configured to perform a third home automation system action based on the first activation duration and a fourth home automation system action based on the second activation duration. That is, the control component 530 may perform a third home automation system action based on the first activation duration and a fourth home automation system action based on the second activation duration.

In some examples, the device 505 includes instructions stored in the memory and executable by the processor to cause the device 505 to activate the at least one control button based on receiving an input from a user associated with the home automation system, the input comprising the user associated with the home automation system pressing the at least one control button for one or more of the first activation duration or the second activation duration. In some examples, the instructions are further executable by the processor to cause the device 505 to activate the at least one control button based at least in part on receiving the input from the user associated with the home automation system a number of times within a threshold period. In some examples, the first activation duration is shorter than the second activation duration. In some examples, the first frequency band is a 908.42 megahertz frequency band and the second frequency band is a 2.4 gigahertz frequency or a 915 megahertz frequency band. In some examples, each control button of the set of control buttons is located on a perimeter of an anterior surface of the panel.

In some examples, the device 505 may be a part of a home automation system as described herein. For example, the home automation system may include a lighting control panel (e.g., the device 505), a set of home automation devices, where at least a subset of the set of home automation devices are being controlled by the lighting control panel, and a home automation hub in wireless communications with the lighting control panel, which may be examples of corresponding devices described herein with reference to FIGS. 1 through 4. In some examples, the lighting control panel includes a first radio device in wireless communications with the subset of the set of home automation devices. In some examples, the lighting control panel further includes a second radio device in wireless communications with the home automation hub. In some examples, the home automation hub controls a set of lighting control panels distributed within a building associated with the home automation system. In some examples, the lighting control panel may be associated with a region associated with the building.

The device 505 may include a panel including a number of screw holes or other fasteners that align with a number of screw holes or other fasteners of a light switch panel, where the device 505 is configured to be installed over the light switch panel using the number of screw holes or other fasteners, a number of control buttons on the front panel, where the number of control buttons are flush with the front panel, and a back panel that encloses a number of radio components and a battery between the front panel and the back panel. In some examples, the number of control buttons may be distributed along a perimeter of an anterior surface of the front panel such that each control button includes a portion of the perimeter of the anterior surface of the front panel and the number of control buttons form a contiguous perimeter of the anterior surface of the front panel.

The controller 515, or its sub-components, may be implemented in hardware, code (e.g., software or firmware) executed by a processor, or any combination thereof. If implemented in code executed by a processor, the functions of the controller 515, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The controller 515, or its sub-components, may be physically located at various positions, including being distributed such that portions of functions are implemented at different physical locations by one or more physical components. In some examples, the controller 515, or its sub-components, may be a separate and distinct component in accordance with various aspects of the present disclosure. In some examples, the controller 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure. The transmitter 545 may transmit signals generated by other components of the device 505. In some examples, the transmitter 545 may be collocated with a receiver 510 in a transceiver module. The transmitter 545 may utilize a single antenna or a set of antennas.

means for controlling one or more devices associated with a building;

means for restraining a state of a switch disposed on a wall of the building;

means for removably coupling the panel to the switch in a first mode; and means for removably coupling the panel directly to the wall of the building in a second mode means for controlling one or more devices associated with a home;

means for receiving a switch disposed on a wall of the home, the switch in communication with at least one of the one or more devices;

means for receiving input from a user;

means for transmitting one or more communications to the one or more devices associated with the home to cause the one or more devices to perform a first action based on the input received from the user; and means for transmitting one or more communications to a home automation hub to cause one or more other devices associated with the home to perform a second action based on the input received from the user means for tracking a location of the user as the user moves between rooms of the home based on the received input from the user, the first action and the second action comprising a scene for the user, the scene selected based on the tracked location The detailed description set forth herein in connection with the appended drawings describes examples and does not represent the only instances that may be implemented or that are within the scope of the claims. The terms “example” and “exemplary,” when used in this description, mean “serving as an example, instance, or illustration,” and not “preferred” or “advantageous over other examples.” The detailed description includes specific details for the purpose of providing an understanding of the described techniques. These techniques, however, may be practiced without these specific details. In some instances, known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration. An operating system utilized by the processor (or by I/O controller module or another module described above) may be iOS®, ANDROID®, MS-DOS®, MS-WINDOWS®, OS/2®, UNIX®, LINUX®, or another known operating system.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term “and/or,” when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can include RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some cases, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various cases have been described and/or illustrated here in the context of fully functional computing systems, one or more of these exemplary cases may be distributed as a program product in a variety of forms, regardless of the particular type of computer-readable media used to actually carry out the distribution. The cases disclosed herein may also be implemented using software modules that perform certain tasks. These software modules may include script, batch, or other executable files that may be stored on a computer-readable storage medium or in a computing system. In some cases, these software modules may permit and/or instruct a computing system to perform one or more of the exemplary cases disclosed here.

This description, for purposes of explanation, has been described with reference to specific cases. The illustrative discussions above, however, are not intended to be exhaustive or limit the present systems and methods to the precise forms discussed. Many modifications and variations are possible in view of the above teachings. The cases were chosen and described in order to explain the principles of the present systems and methods and their practical applications, to enable others skilled in the art to utilize the present systems, apparatus, and methods and various cases with various modifications as may be suited to the particular use contemplated.

What is claimed is:

1. An apparatus, comprising:
- a panel for controlling one or more lighting devices associated with a building, the panel comprising:
  - at least one button disposed on the panel;
  - a wireless communication device; and
  - a controller in electronic communication with the wireless communication device to wirelessly control the one or more lighting devices in response to the at least one button being pressed;
  - wherein:
    - the panel is shaped and sized to completely cover a traditional wall-mount light switch and an electrical box to which the light switch is coupled, wherein the light switch is a traditional wall mount light switch;
    - at least one first fastener structure for the panel aligned with a fastener for the light switch to removably couple the panel to the light switch in a first mode; and
    - at least one second fastener structure for the panel to removably couple the panel directly to a wall of the building in a second mode.

2. The apparatus of claim 1, further comprising a wireless power source.

3. The apparatus of claim 2, wherein the wireless power source further comprises a battery and a power component, the power component configured to charge the battery using electric power from the light switch while the light switch is in an off position and to provide the panel electric power from the battery at least while the light switch is in an on position.

4. The apparatus of claim 1, wherein the panel includes a backplate and a front plate, the backplate being coupleable to the electrical box.

5. The apparatus of claim 4, wherein the at least one button is disposed on the front plate.

6. The apparatus of claim 4, wherein the panel is configured to prevent user manipulation of the light switch without removing the front plate of the panel.

7. The apparatus of claim 1, wherein the panel is configured to replace a switch plate cover for the light switch.

8. The apparatus of claim 1, further comprising a recess disposed in the panel, the recess shaped to encapsulate a second light switch disposed adjacent to the light switch and to restrain a state of the second light switch.

9. The apparatus of claim 8, wherein the at least one button comprises two sets of buttons disposed on the panel, one of the sets of buttons corresponding to the light switch to control a first device of the one or more lighting devices and another of the sets of buttons corresponding to the second light switch to control a second device of the one or more lighting devices.

10. The apparatus of claim 4, wherein the backplate comprises the controller, the wireless communication device, the at least one first fastener structure, the at least one second fastener structure, and at least one third fastener structure configured to removably couple the front plate of the panel to the backplate.

11. The apparatus of claim 1, wherein the at least one first fastener structure for the panel comprises at least two screw holes for installing the panel over the light switch.

12. The apparatus of claim 1, wherein the one or more lighting devices comprise one or more light sources associated with the building and at least one of the one or more light sources is in electrical communication with the light switch.

13. The apparatus of claim 1, wherein the at least one button is configured to perform a first home automation system action based at least in part on a first activation duration and a second home automation system action based at least in part on a second activation duration.

14. The apparatus of claim 13, wherein one or more of the first home automation system action and the second home automation system action comprises one or more of activating a light source, deactivating the light source, dimming the light source, activating the one or more lighting devices associated with the building, deactivating the one or more lighting devices associated with the building, activating a setting of the panel, deactivating the setting of the panel, or any combination thereof.

15. The apparatus of claim 1, wherein the wireless communication device comprises:

a first radio component configured to communicate with the one or more lighting devices using a first frequency band; and a second radio component configured to communicate with a home automation hub using a second frequency band.

16. A system comprising:

a lighting control panel, comprising:

a cover plate; and a submount removably coupleable to the cover plate, the submount comprising:

a controller;

a battery;

at least one wireless communication device;

an opening in at least the submount, the opening shaped and sized to completely encapsulate a traditional wall-mount light switch and to restrain an on-off state of the light switch;

at least one first fastener structure for the lighting control panel aligned with a fastener structure for the light switch to removably couple the lighting control panel to the light switch in a first mode; and at least one second fastener for the lighting control panel to removably couple the lighting control panel directly to a wall of a building in a second mode;

a set of home automation devices, wherein at least a subset of the set of home automation devices is controlled by the lighting control panel; and a home automation hub in wireless communications with the lighting control panel.

17. The system of claim 16, wherein the at least one wireless communication device comprises a first radio device in wireless communication with the subset of the set of home automation devices and a second radio device in wireless communication with the home automation hub.

18. The system of claim 16, wherein the submount further comprises at least one third fastener structure configured to removably couple the lighting control panel to the submount.

19. An apparatus comprising:

means for controlling one or more lighting devices associated with a building;

means for restraining a state of a traditional wall-mount light switch disposed on a wall of the building;

means for removably coupling a panel to completely cover the light switch in a first mode; and means for removably coupling the panel directly to the wall of the building in a second mode.

20. The apparatus of claim 19, further comprising means for changing the state of the light switch in response to input received at the panel.

* * * * *